United States Patent [19]

MacNeal, Jr. et al.

[11] Patent Number: 4,795,957
[45] Date of Patent: Jan. 3, 1989

[54] ROBOT ARM HAVING MOTION-LIMITING TETHER

[75] Inventors: Edward H. MacNeal, Jr., Quincy; Kenneth W. Stadtman, Framingham, both of Mass.

[73] Assignee: Polaroid Corporation, Patent Department, Cambridge, Mass.

[21] Appl. No.: 92,637

[22] Filed: Sep. 3, 1987

[51] Int. Cl.[4] ............................................. G08B 19/42
[52] U.S. Cl. .................................. 318/568; 200/334; 901/49; 318/563
[58] Field of Search ............... 318/568, 563; 901/11, 901/12, 13, 49; 200/334

[56] References Cited

U.S. PATENT DOCUMENTS

| | | |
|---|---|---|
| 1,775,435 | 9/1930 | Lichtenberg . |
| 3,334,756 | 8/1967 | Whitmire ........................... 212/39 |
| 3,447,692 | 6/1969 | Thomas ............................. 212/39 |
| 3,938,613 | 2/1976 | Raborn ........................... 200/334 X |
| 4,236,864 | 12/1980 | Couture et al. ................... 414/698 |
| 4,535,207 | 8/1985 | Lindquist ........................ 901/49 X |
| 4,536,690 | 8/1985 | Belsterling et al. ........... 318/568 M |
| 4,583,084 | 4/1986 | Henderson et al. .......... 200/334 X |
| 4,586,868 | 5/1986 | Nakashima et al. ............ 901/12 X |
| 4,588,347 | 5/1986 | Murta ............................... 901/49 X |
| 4,636,604 | 1/1987 | Gomes ........................... 200/334 X |
| 4,636,699 | 1/1987 | Kato ............................... 318/563 X |
| 4,697,929 | 10/1987 | Nakashima et al. ............ 901/49 X |

Primary Examiner—Benjamin Dobeck
Attorney, Agent, or Firm—John J. Kelleher

[57] ABSTRACT

An electrical power interrupting tether system for a multiple-joint, anthropomorphic robot arm that substantially improves robot arm operational safety. The tether system includes a robot arm and auxiliary equipment power-interrupting electrical robot arm member by a set of braided steel wires. A pair of conventional robot arm and auxiliary equipment power-interrupting limit switches actuated by excessive rotational robot arm movement are also provided. Movement of the robot arm beyond a predetermined safety zone defined by each arm-member-tethering wire and the limit switch pair will cause electrical power interruption to both the robot arm and to auxiliary equipment associated therewith to thereby preclude potentially unsafe movement of the robot arm beyond the above-defined safety zone.

12 Claims, 3 Drawing Sheets

ROBOT ARM HAVING MOTION-LIMITING TETHER

BACKGROUND OF THE INVENTION

The present invention relates to programmed industrial robots, in general, and to means for limiting the movement of a computer controlled, anthropomorphic robot arm to within a prescribed spacial envelope to improve its operational safety, in particular.

Industrial robots are programmed mechanical devices that are capable of automatically performing material handling tasks, for extended periods of time, without human intervention. Properly applied industrial robots can increase productivity as well as relieve human operators from tasks that are excessively burdensome, boringly routine and/or dangerous. An anthropomorphic industrial robot arm has an articulated mechanical arm and hand with freedom of movement that is roughly equivalent to a human waist, shoulder, elbow and wrist. The robot's hand can be automatically positioned to any point within reach and is capable of grasping various parts or tools with relative ease. One such industrial robot is sold by Unimation, Inc. of Danbury, CT under its trademarks UNIMATE and PUMA.

Industrial robots are typically controlled by computer software or a set of instructions stored in the memory of a digital computer. The robot arm executes the material or parts positioning instructions as they are received from computer memory. These robot arm position-controlling instructions received by the robot arm are in the form of fairly precise elecrical signals whose characteristics control the type and extent of robot arm movement. Any significant variation in one or more of the characteristics associated with these robot arm position-controlling signals will produce corresponding variations in robot arm movement.

A digital computer is an electrically operated device that occasionally becomes susceptible to spurious or random electrical signals. These spurious signals may enter the computer from its power source or may be spontaneously generated within one or more of its system components. Whatever the cause of these signals, one of their effects is to cause the computer to transmit spurious positioning signals to, for example, a robot arm under its control. These spurious positioning signals may produce sudden, unpredictable robot arm movement that could cause serious injury to personnel in the vicinity of the computer-controlled robot arm.

One way to protect personnel from injury due to spurious-signal-induced robot arm movement would be to enclose the robot arm in a fairly rigid protective cage. The protective cage would preclude contact between the moving robot arm and any personnel in close proximity thereto under such circumstances. A disadvantage associated with this arrangement is that a protective cage makes it more difficult for personnel to service the robot arm during normal robot arm operation. Another way to protect personnel from such injury would be to enclose the robot arm in a system of protective light beams. If any of the beams were broken by, for example, personnel coming too close to the spacial envelope within which the robot arm is capable of operating, electrical power to the robot arm would immediately be interrupted. Disadvantages associated with this arrangement would be equipment cost and the liklihood of excessive robot arm power interruptions due to inadvertent cutting of one or more of the protective light beams controlling access to the robot arm.

A primary object of the invention, therefore, is to improve the operational safety of a computer-controlled anthropomorphic robot arm.

Another object of the present invention is to provide a simplified system for limiting the movement of a computer-controlled anthropomorphic robot arm to within a predetermined spacial envelope.

A further object of the present invention is to minimize the effects of spurious or random electrical signals on a computer that controls the positioning of an anthropomorphic robot arm.

Other objects and advantages of our invention will be made readily apparent by referring to the preferred embodiments thereof described in detail below.

SUMMARY OF THE INVENTION

In accordance with the present invention, an electrical power interruption tether system for a multiple-joint, anthropomorphic robot arm is provided that substantially improves robot arm operational safety. The tether system includes robot arm and auxiliary equipment power-interrupting apparatus and means coupling said apparatus to an extendible robot arm member. Means coupled to said power-interrupting apparatus for sensing when said robot arm is rotated to limits defined by a predetermined angle are also provided. Movement of said robot arm to the limits of a spacial zone defined by the lenth of said coupling means and by said predetermined angular limits activates said power interrupting apparatus to its power interrupting mode and thereby precludes potentially unsafe extensible and/or rotational robot arm movement beyond said predetermined spacial zone and unsafe auxiliary equipment operation, if such robot arm movement should occur.

DESCRIPTION OF THE PREFERRED EMBODIMENTS

Figure 1:
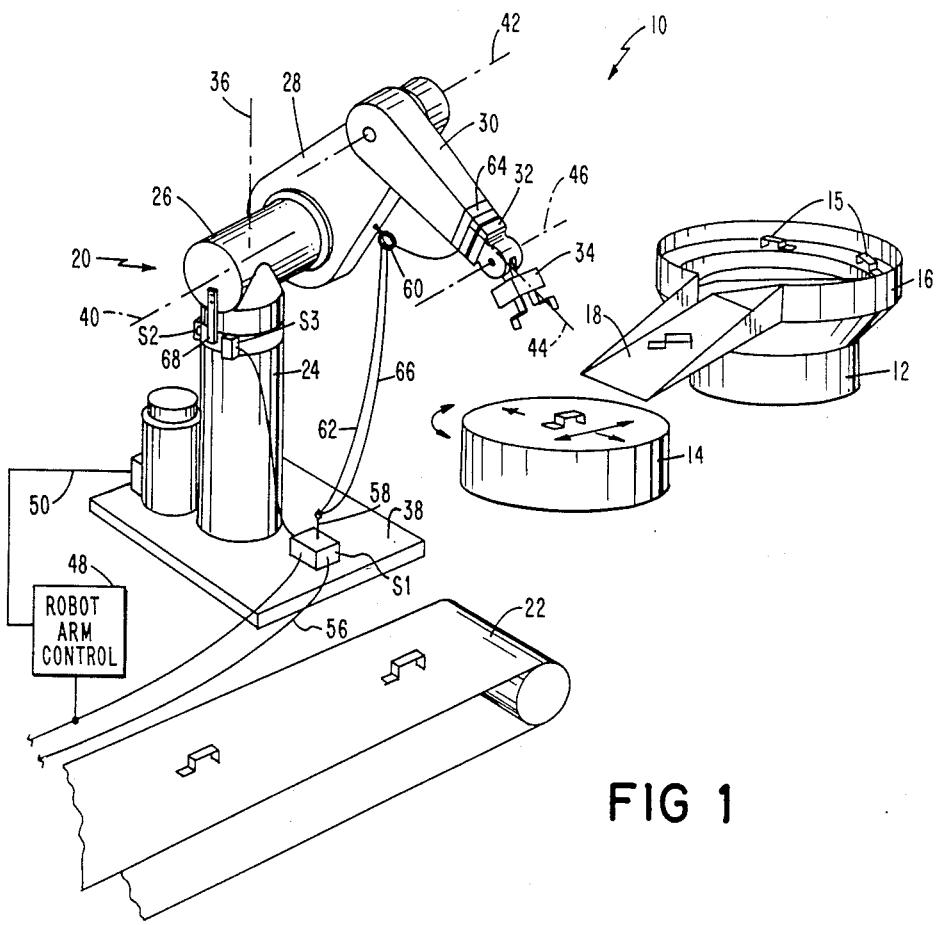
FIG. 1 is a system diagram of object positioning apparatus incorporating a preferred embodiment of the robot arm tethering apparatus of the present invention.

In FIG. 1 of the drawings, a partial system diagram of object placement apparatus 10 incorporating a preferred embodiment of the present invention, is depicted. Object placement apparatus 10 includes, in part, mechanical vibrator 12 for separating the objects that are to be placed in a particular position and orientation, from one another. Apparatus 10 also includes x, y, θ table 14 for moving the object in any direction within a particular plane and/or about an axis at right angles to said plane to a particular orientation as determined by conventional object position sensing apparatus (not shown) such as that shown in U.S. Pat. No. 4,575,637 to Sullivan, Jr. The specification in said Sullivan, Jr. patent is specifically incorporated herein by reference.

When energized, mechanical vibrator 12 moves objects 15 from its object-containing hopper 16 down chute 18 and onto x, y, θ table 14. Object placement apparatus 10 also includes industrial robot 20. When placed in a particular position and orientation by x, y, θ table 14 and said conventional object position sensing apparatus, the object is picked up by industrial robot 20 and subsequently placed on conveyor belt 22. Industrial robot 20 is preferably a computer-controlled anthropomorphic robot arm system such as that noted above manufactured by Unimation, Inc. Conveyor belt 22 moves the precisely oriented and positioned object to the first of several workstations where it is assembled into a final product. The position and orientation of the objects on table 14 is the initial or reference position and orientation of objects transferred from table 14 to conveyor belt 22 by industrial robot arm 20. Changes made in object position and/or orientation by robot 20 when transferring an object from table 14 to belt 22 are always made with respect to its said initial or reference position and orientation.

Robot arm 20 is a five degree of freedom device, i.e., it has a total of five axes about which various robot arm members may be rotated to place an object in a particular position and orientation. Each member of the robot arm is connected to another member at a joint, much like a human arm and torso. Through each such joint passes one or more axes around which the members of the arm rotate. The members of the robot arm, as shown in FIG. 1, are waist member 24, shoulder member 26, upper arm member 28, forearm member 30, wrist member 32 and gripper member 34. The robot arm members contain the various servomotors and gear trains necessary to produce the required degree of robot arm member movement.

The axes of rotation of said robot arm members are as follows: waist axis 36, which is perpendicular to horizontally positioned robot arm mounting plate 38 and coincident with the centerline of waist member 24; shoulder axis 40, which is perpendicular to and intersects waist axis 36, is coincident with the centerline of shoulder member 26; elbow axis 42, which is parallel to shoulder axis 40; wrist rotational axis 44 which is perpendicular to and intersects elbow axis 42, is coincident with the centerline of forearm member 30; and gripper rotational axis 46, which is perpendicular to and intersects said wrist axis 44.

Rotational movement of the above-noted robot arm members of robot arm 20 is controlled by robot arm control system 48. System software that controls such movement of arm 20 is stored in the memory of a computer (not shown) located within robot arm control system 48. The operational controls (not shown) for robot arm 20 are also located within said control system 48. Robot arm 20 executes all of the preprogrammed movement instructions transmitted to it from the memory of the computer within robot arm control system 48 through path 50.

Figure 2:
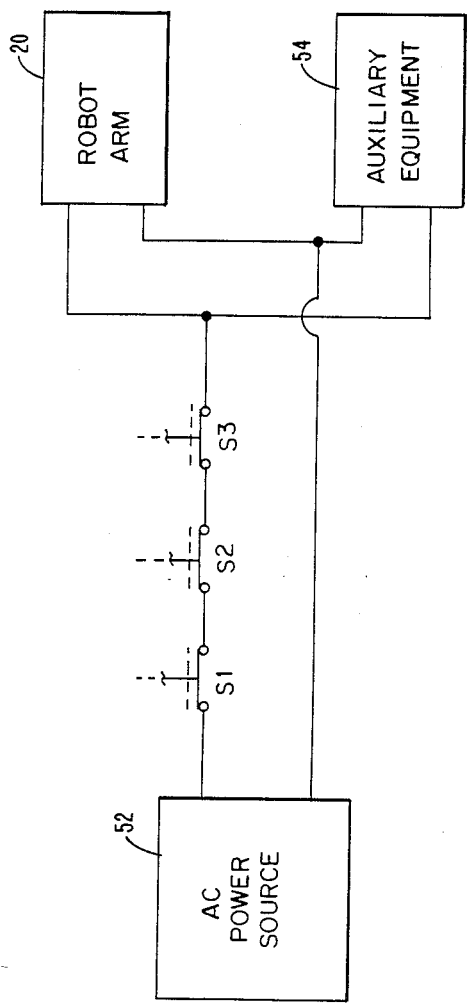
FIG. 2 is a diagram of the electrical circuit supplying AC power to the object positioning apparatus shown in drawing FIG. 1.

AC power applied to object placement apparatus 10 is supplied by AC power source 52 that is schematically depicted in drawing FIG. 2. As shown in FIGS. 1 and 2, electrical power from AC power source 52 is applied to robot arm 20 and associated auxiliary equipment 54 that includes mechanical vibrator 12, x, y, θ table 14 and conveyor belt 22, through path 56 and series connected electrical switches S1, S2 and S3. Switch S1 is a single-pole lanyard-type switch, Model No. 802T-CM manufactured by the Allen Bradley Co. of Milwaukee, Wis. Switch S1 includes actuator 58 for actuating said switch S1 from its normally closed to its open or power interrupting position. Switch S1 remains in its open position until manually reset back to its normal or closed position by an equipment operator. Switches S2 and S3 are conventional single-pole momentary switches that are normally spring-force loaded to their closed or power-transmitting positions. Switches S2 and S3 remain in their open or power interrupting positions so long as a force is applied to each of their switch contact opening actuators.

Actuator 58 of lanyard switch S1 is connected to eye bolt 60 mounted intermediate the ends of upper robot arm member 28 by flexible steel cable 62. Actuator 58 is also connected to collar 64 mounted in a fixed position at the gripper 34 end of forearm member 30 of said robot arm 20 by flexible steel cable 66. Cable 66, connecting actuator 58 to forearm member 30, is preferably routed through the opening in eyebolt 60. Cable 66 is routed through the opening in eyebolt 60 in order to preclude any interference between said cable 66 and the objects to be positioned. Momentary switches S2 and S3 are mounted in a fixed position and in a laterally spaced relation on the upper end of waist member 24. Elongated metal bar 68 is mounted in a fixed position on shoulder member 26 for rotation therewith. Rotational movement of shoulder member 26, including metal bar 68 mounted thereon about waist axis 36, causes said metal bar 68 to engage each of the actuators on switches S2 and S3 when shoulder member 26 is rotated in opposite directions about said axis 36 to predetermined switch actuating angular positions. These predetermined angular positions are established by the lateral spacing between momentary switches S2 and S3 and their physical placement on upright waist member 24.

Figure 3:
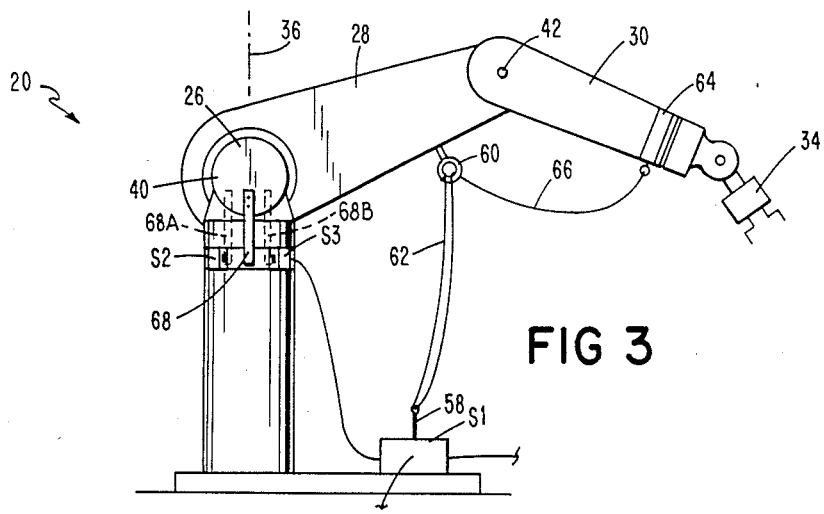
FIG. 3 is a diagrammatic elevational view showing the robot arm of FIG. 1 operating within its designed operation envelope.
Figure 4:
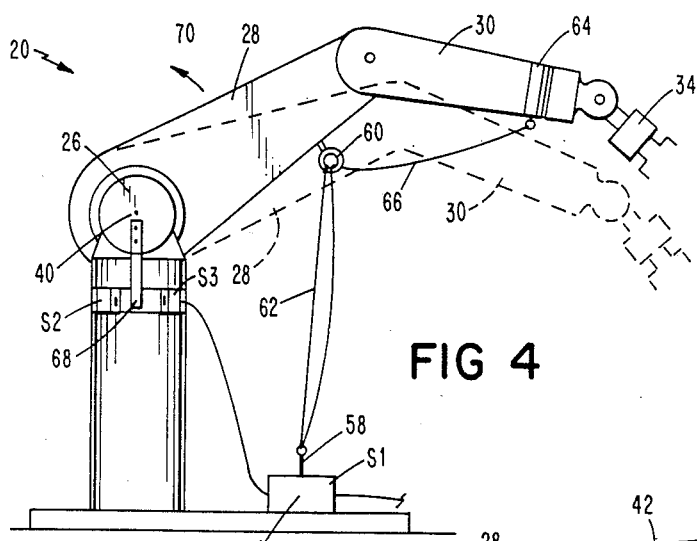
FIG. 4 is a diagrammatic elevational view showing the electrical switch controlling AC power to the object positioning apparatus of the present invention actuated to its power interrupting position by the movement of the upper robot arm member of the robot arm in FIG. 1 outside of its operational envelope.
Figure 5:
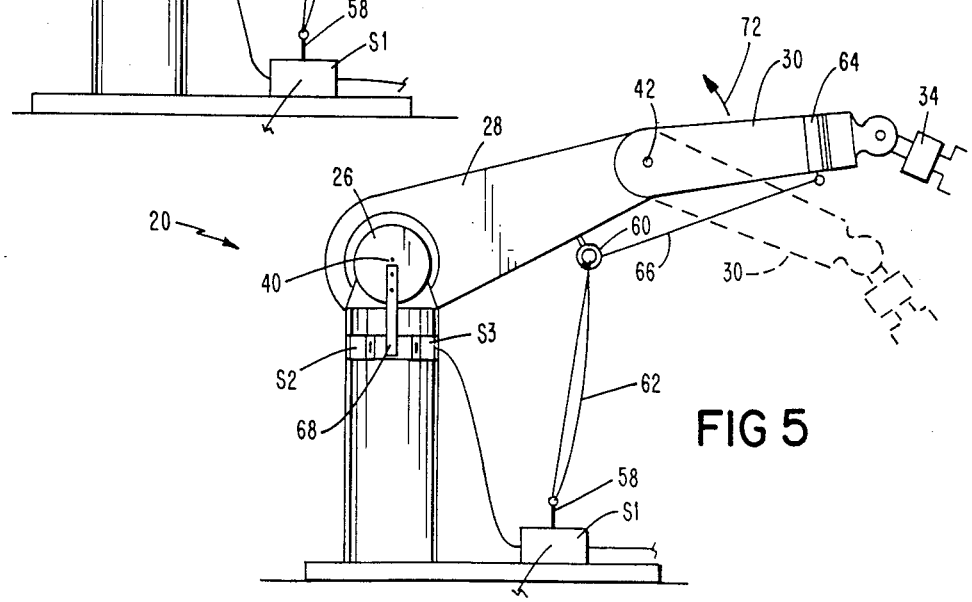
FIG. 5 is a diagrammatic elevational view showing the electrical switch controlling AC power to the object positioning apparatus of the present invention actuated to its power interrupting position by the movement of the forearm member of the robot arm of FIG. 1 outside of its operational envelope.

In normal operation, robot arm control 48, in drawing FIG. 1, transmits robot arm positioning commands to robot arm 20 for object positioning purposes. Referring additionally to drawing FIG. 3, during such normal operation shoulder member 26 can freely rotate about axis 36, upper arm member 28 can freely rotate about axis 40 and forearm member 30 can freely rotate about axis 42 in response to object positioning commands from robot arm control 48 so long as such rotational movement does not cause the actuation of electrical switches S1, S2 or S3 to their open or robot arm 20 and auxiliary equipment 54 power interrupting positions. If elongated metal bar 68 mounted on shoulder member 26 is rotated about axis 36 to either position 68A or 68B as shown in drawing FIG. 3, said bar 68 will respectively actuate switches S2 or S3 to their open or power interrupting positions. Similarly, as shown in FIG. 4, if upper arm member 28 rotates in direction 70 about axis 40 to the point where steel cable 62 is pulled taut and thereafter transmits such motion to switch S1 actuator 58, switch S1 will be actuated to its open or power-interrupting position by the continued rotation of said member 28. Also, as shown in drawing FIG. 5, if forearm member 30 rotates in direction 72 about axis 42 to the point where steel cable 66 is pulled taut and thereafter transmits such motion to switch S1 actuator 58, switch S1 will be actuated to its open or power-interrupting position by the continued rotation of said member 30. It should be noted that the degree of rotation of forearm member 30 required to actuate switch S1 to its open position is dependent upon the rotational position of upper member 28 at the time of such switch actuation.

Robot arm 20 normally operates within a spacial zone or volume defined by the lateral rotation of shoulder member 26 about waist axis 36 and the vertical movement of upper arm member 28 and forearm member 30 about axes 40 and 42, respectively, to the extent that, or so long as, lanyard switch S1 and momentary switches S2 and S3 are not actuated to their open or power-interrupting positions by such robot arm member rotation. If erroneous instructions were transmitted to robot arm 20 by, for example, control 48 (FIG. 1) commanding said robot arm to move out of the above-defined spacial zone and possibly injure nearby personnel, switches S1, S2 or S3 would be actuated to their open position thereby interrupting robot arm power to thereby preclude potentially injurious robot arm movement outside of its said operational zone. If robot arm 20 is commanded to move outside of its operational zone and power to robot arm 20 and auxiliary equipment 54 is interrupted by such movement, robot arm control must be manually overridden in order to restore the electrical power to robot arm 20 and auxiliary equipment 54.

It will be apparent to those skilled in the art from the foregoing description of our invention that various improvements and modifications can be made in it without departing from its true scope. The embodiments described herein are merely illustrative and should not be viewed as the only embodiments that might encompass our invention.

What is claimed is:

1. Apparatus for limiting the extent of movement of a robot arm to within a predetermined spacial zone, comprising:

an energizeable robot arm having a first member mounted for rotation about a first axis and a second member mounted for rotation about a second axis forming an angle with respect to said first axis;

means for coupling said robot arm to a suitable source of electrical power, said power coupling means including a power-controlling actuator actuatable between a first position where it couples said electrical power to said robot arm and a second position where it interrupts electrical power to said robot arm until subsequently reset to its said electrical power coupling position;

means coupled to said power-coupling means, responsive to the rotation of said first member about said first axis to first and second rotational positions, for interrupting said electrical power to said robot arm when said first member is rotated to either said first or second rotational positions; and means attaching said power-controlling actuator to said second robot arm member wherein rotational movement of said second robot arm member beyond a predetermined angle is coupled to said power-controlling actuator to thereby actuate said electrical power controlling means from its said first position to its said second position and thereby interrupt electrical power to said robot arm.

2. The invention of claim 1, wherein said power-controlling actuator is a manually resettable lanyard switch operable between said first and second electrical power-controlling positions.

3. The invention of claim 1, further comprising:

a third member mounted for rotation about a third axis parallel to and spaced from said second axis; and means attaching said power-controlling actuator to said third robot arm member wherein rotational movement of said third robot arm member beyond an angle dependent upon the angle of rotation between said first axis and said second robot arm member, is coupled to said power-controlling actuator to thereby actuate said actuator from its said first position to its said second position and thereby interrupt electrical power to said robot arm.

4. The invention of claim 3, further comprising:

energizable auxiliary equipment for conveying articles to said robot arm for subsequent movement by said robot arm to a predetermined position and/or orientation and for conveying said articles away from said robot arm after such robot arm movement; and means for coupling said auxiliary equipment to said suitable source of electrical power through said robot arm to power source coupling means whereby electrical power to said auxiliary equipment is also interrupted when said power-controlling actuator is actuated from its said first position to its said second position.

5. The invention of claim 4, wherein said suitable source of power is an AC power source.

6. The invention of claim 3, wherein each of said means attaching said second and third robot arm members to said power-controlling actuator includes a flexible steel cable attached to said actuator at one end and to different attach points on either said second or third robot arm members at their other end whereby rotational movement of either said second or third robot arm members beyond their said respective predetermined angles actuates said power-controlling actuator from its said first position to its power-interrupting second position.

7. The invention of claim 6, wherein an end of one of said flexible steel cables is fixedly attached to said second robot arm member and an end of the other of said flexible steel cables is fixedly attached to said third robot arm member and slideably attached to said second robot arm member intermediate of the ends of said other flexible steel cable.

8. The invention of claim 7, wherein said third robot arm member includes a rigid collar attached to the outer surface thereof and an end of said other flexible steel cable is attached to said rigid collar.

9. Apparatus for limiting movement of a computer-controlled anthropomorphic robot arm to within a predetermined spacial zone, comprising:

an energizeable computer-controlled anthropomorphic robot arm having a waist member mounted for rotation about a first axis, an upper arm member mounted for rotation about a second axis forming a right angle with respect to said first axis and a forearm member mounted for rotation about a third axis parallel to and spaced from said scond axis;

a lanyard-type electrical switch for coupling said robot arm to a source of AC power, said switch including a power-controlling actuator actuatable between a first position where it couples said AC power to said robot arm and a second position where it interrupts said AC power to said robot arm until manually reset to its said electrical power coupling position; and means including a flexible steel cable for attaching said power-controlling actuator to said upper arm and forearm members wherein rotational movement of either said upper arm member beyond a predetermined angle or rotational movement of said forearm member beyond an angle dependent upon the angle of rotation between said first axis and said upper arm member, is coupled to said switch to thereby actuate said swtich from its said first position to its said second position and thereby interrupt electrical power to said robot arm.

10. The invention of claim 9, further comprising:

energizeable auxiliary equipment for conveying articles to said robot arm for subsequent movement by said robot arm to a predetermined position and/or orientation and for conveying said articles away from said robot arm after such robot arm movement; and means for coupling said auxiliary equipment to said AC power source through said lanyard-type electrical switch whereby AC power to said auxiliary equipment is also interrupted when the said power-controlling actuator of said lanyard-type switch is actuated from its said first position to its said second position.

11. The invention of claim 9, further comprising means coupled to said lanyard-type electrical switch, responsive to the rotation of said waist member to first and second rotational positions, for interrupting said electrical power to said robot arm when said waist member is rotated to either said first or second rotational positions.

12. Apparatus for limiting movement of a pair of robot arm members to within a predetermined spacial zone, comprising:

an energizable robot arm having one member mounted for rotation about one axis and another member mounted for rotation about another axis spaced from and generally parallel to said one axis;

means for coupling said robot arm to a suitable source of electrical power, said power coupling means including a power-controlling actuator actuatable between a first position where it couples said electrical power to said robot arm and a second position where it interrupts electrical power to said robot arm until subsequently reset to its said electrical power coupling position; and means attaching each of said robot arm members to said power-controlling actuator wherein rotational movement of said one robot arm member beyond a predetermined angle or rotational movement of said other robot arm member beyond an angle dependent upon the rotational position of said one robot arm member is coupled to said power-controlling actuator to thereby actuate said electrical power controlling actuator from its said first position to its said second position and thereby interrupt electrical power to said robot arm.

* * * * *